US008345273B2

(12) United States Patent
Takagi

(10) Patent No.: US 8,345,273 B2
(45) Date of Patent: Jan. 1, 2013

(54) INFORMATION PROCESSING APPARATUS FOR MANAGING AN EXPANSION MODULE, CONTROL METHOD THEREFOR, AND PROGRAM FOR EXECUTING THE METHOD

(75) Inventor: Yoshihiro Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1353 days.

(21) Appl. No.: 12/024,080

(22) Filed: Jan. 31, 2008

(65) Prior Publication Data

US 2008/0186525 A1 Aug. 7, 2008

(30) Foreign Application Priority Data

Jan. 31, 2007 (JP) ................................. 2007-021419

(51) Int. Cl.
*G06F 3/12* (2006.01)
(52) U.S. Cl. ...................................................... 358/1.13
(58) Field of Classification Search .................. 358/1.1, 358/1.12, 1.13, 1.15
See application file for complete search history.

(56) References Cited

U.S. PATENT DOCUMENTS

| 2003/0016378 | A1* | 1/2003 | Ozawa et al. ............... 358/1.13 |
| 2005/0162678 | A1 | 7/2005 | Nakata |
| 2006/0044586 | A1* | 3/2006 | Kujirai et al. ............... 358/1.13 |

FOREIGN PATENT DOCUMENTS

| JP | 10-228504 A | 8/1998 |
| JP | 2002-023882 A | 1/2002 |
| JP | 2003-256670 A | 9/2003 |
| JP | 2004-265061 A | 9/2004 |
| JP | 2005-107777 A | 4/2005 |
| JP | 2005-141454 A | 6/2005 |
| JP | 2005-208895 A | 8/2005 |
| JP | 2006-099747 A | 4/2006 |

OTHER PUBLICATIONS

Japanese Office Action dated Feb. 28, 2012 for JP 2007-021419.

* cited by examiner

*Primary Examiner* — Benny Q Tieu
*Assistant Examiner* — Jeremiah Bryar
(74) *Attorney, Agent, or Firm* — Carter, DeLuca, Farrell & Schmidt LLP

(57) ABSTRACT

The present invention discloses, as an example, an information processing apparatus for downloading an expansion module for a print driver from a server apparatus for setup, including: a reception unit for receiving a program from the server apparatus; a determination unit for determining whether the reception unit receives the expansion module for the print driver and a license management program which is an expansion program for the print driver; an obtaining unit for obtaining, in response to a determination by the determination unit that the reception unit receives the expansion module for the print driver and the license management program, by calling the received license management program, license information indicating a license status of the expansion program; and a decision unit for deciding whether a use of the expansion program is permitted in the information processing apparatus by using the obtained license information.

7 Claims, 13 Drawing Sheets

INFORMATION PROCESSING APPARATUS FOR MANAGING AN EXPANSION MODULE, CONTROL METHOD THEREFOR, AND PROGRAM FOR EXECUTING THE METHOD

BACKGROUND OF THE INVENTION

1. Field of the Invention

The present invention relates to an information processing apparatus, a control method for the information processing apparatus, and a program for executing the control method.

2. Description of the Related Art

Such a system is known that a host computer connected to a printer is configured as a printer server. Then, the printer is used from a client computer connected to the host computer via a network to perform a print.

In such an environment, it is necessary for the client to install the same printer driver as one installed in the printer server. As a program for facilitating such an install in the client, for example, Microsoft Corporation's Point & Print® is known. The client selects and instructs a shared printer on the server side by using an Application Program Interface (API) of the client. Then, information on a printer function and a client OS is exchanged between the client and the server. Based on the exchanged information, the printer server selects a printer driver to be transferred to the client. The client installs the printer driver transferred from the printer server. The above-described function is referred to as Point & Print®.

This Point & Print® function is mainly realized as a part of functions in an operating system of Microsoft Corporation. An advantage of the Point & Print® resides in that when a user operating a client computer desires to perform a print, it is possible to immediately and automatically execute the install operation. Also, a storage medium such as a CD-ROM storing the printer driver is not required on the client side.

A demand for achieving higher functions of the printer driver has increased year by year. For example, as disclosed in Japanese Patent Laid-Open No. 2005-107777, a copy-forgery-inhibited pattern print function is realized by the printer driver. If all functions only used in particular occasions such as the copy-forgery-inhibited pattern print function are mounted to the printer driver, the memory amount occupied by the printer driver may become too large. In view of the above, as proposed in Japanese Patent Laid-Open No. 2005-208895, such a particular function can be realized by using an additional module that can be detachably mounted to the printer driver (which will be hereinafter referred to as Add-in).

As the copy-forgery-inhibited pattern print is a high additional value function, the license management is desired to be performed by an administrator only in a case where the printer driver realizes the copy-forgery-inhibited pattern print function through the Add-in. However, the printer driver including the Add-in is automatically downloaded from the server to the client through the Point & Print® function, and the license management is thus difficult. The Point & Print® is an example of the download installation.

On the other hand, Japanese Patent Laid-Open No. 2002-23882 proposes a client license management method with which a client application program activation is enabled only from client apparatuses by the number of permitted licenses. According to this proposal, such a scheme is adopted that the license is checked when the client application is activated.

However, the printer driver is different from a general application program, and is sometimes made as a DLL (Dynamic Link Library) which is called from an OS or an application.

There is a presupposition that a timing or a frequency at which the OS or the application calls the printer driver cannot be controlled by the printer driver itself. If the license management is performed by communicating with the server or the like at the time of the printer driver activation, a communication is generated at an unexpected timing or frequency between the license server and the printer driver. This is not preferable in terms of performance efficiency.

Furthermore, the license management is not desired in a case of using the printer driver alone, but a flexible control management cannot be performed: for example, the license management is performed only when an expanded function is added through the Add-in.

In addition, if the license management function is included in the printer driver, the license management function is closely coupled with the printer driver. When the printer driver is updated, the license management function is also updated. The traffic at the time of the update is increased and the flexibility is not attained.

SUMMARY OF THE INVENTION

The present invention discloses, for example, an information processing apparatus for downloading an expansion module for a print driver from a server apparatus for setup, including: a reception unit configured to receive a program from the server apparatus; a determination unit configured to determine whether the reception unit receives the expansion module for the print driver and a license management program which is an expansion program for the print driver; an obtaining unit configured to obtain, in response to a determination by the determination unit that the reception unit receives the expansion module for the print driver and the license management program, by calling the license management program received by the reception unit, license information indicating a license status of the expansion program; and a decision unit configured to decide whether a use of the expansion program is permitted in the information processing apparatus by using the license information obtained by the obtaining unit. According to the present invention, it is possible to realize the appropriate management for the expansion module license in the system where the expansion module for the printer driver is downloaded from the server apparatus for the setup.

Other features and advantageous of the present invention will be apparent from the following description taken in conjunction with the accompanying drawings, in which like reference characters designate the same (or alternatively similar) parts throughout.

DESCRIPTION OF THE EMBODIMENTS

Hereinafter, a description is provided of exemplary embodiments according to the present invention with reference to the accompanying drawings.

Figure 1:
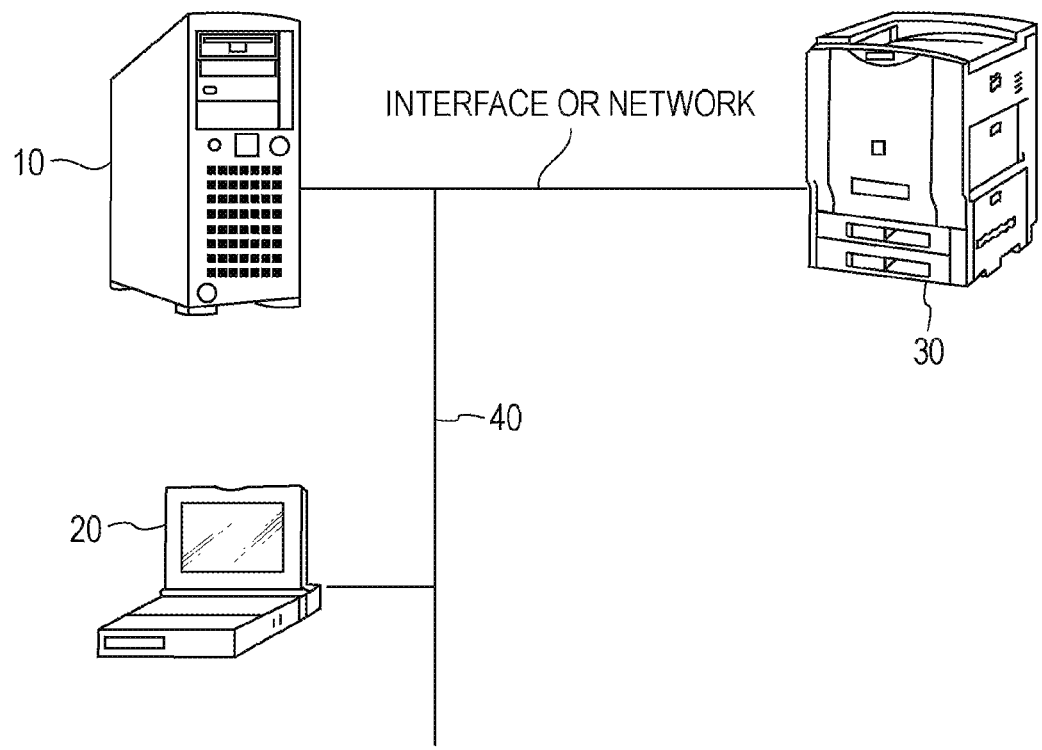
FIG. 1 illustrates a configuration example of a print server system for use with an exemplary embodiment of the present invention.

FIG. 1 is a drawing for describing a configuration example of a print server system for use with an exemplary embodiment of the present invention.

In FIG. 1, a print server 10 functions as a host computer. A client computer 20 is represented herein by a laptop or notebook type personal computer. Any client computer may be used so long as the computer can attain similar functions as the above-described apparatus. A printer apparatus 30 is represented herein by a laser beam printer, but the printer apparatus may be an inkjet printer or other printer. The print server 10 is connected to the printer apparatus 30 via an interface or network 40, such as USB, Centronics, or Ethernet®. Also, the print server 10 is connected to the client computer 20 via the interface or network 40 or the like.

In the print server system provided with such a configuration, the print server 10 itself can use the printer apparatus 30 to perform the print. However, in this case, the print server system is constructed to support performing a print while print data input from the client computer 20 is mediated and the print data is output via the printer apparatus 30.

As described above, at least one program provided with a print function is incorporated in the print server 10, and at the same time, a printer driver for mediating a print from an application to the printer apparatus 30 is also incorporated. In addition, a program provided with at least one print function the same as (or alternatively similar to) the printer server 10 is also incorporated in the client computer 20.

For a user utilizing the client computer 20 to print the print data by using the printer apparatus 30, it is necessary to incorporate the same printer driver incorporated in the print server 10 in the client computer 20. This is because the print data generated by the application of the client computer 20 needs to be processed by the printer driver on the print server 10 before being input to the printer apparatus 30. Furthermore, in order for the printer driver of the print server 10 to process the print data, it is necessary for the same printer driver on the client computer 20 to process the print data.

Therefore, in the above-described print server system, it is necessary to install the same printer driver as one installed in the print server 10 in the client computer 20. However, there is a problem that such an installation operation in the client computer 20 becomes a burden for the user utilizing the client computer 20.

As a method of solving this problem, the above-described Point & Print® is known.

Figure 2:
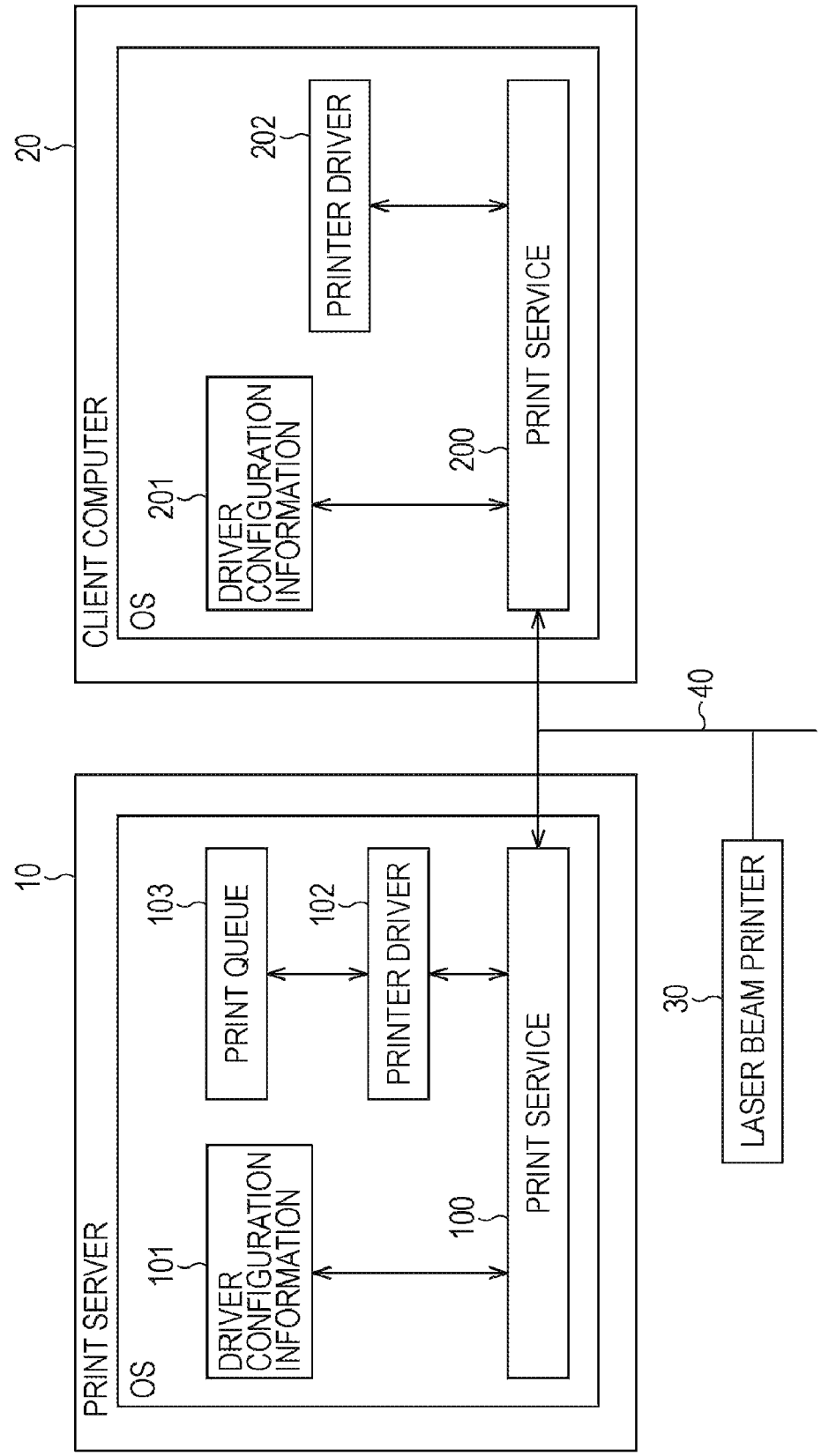
FIG. 2 is a function block diagram for describing function configurations of a print server system and a client computer in a conventional print server system.
Figure 3:
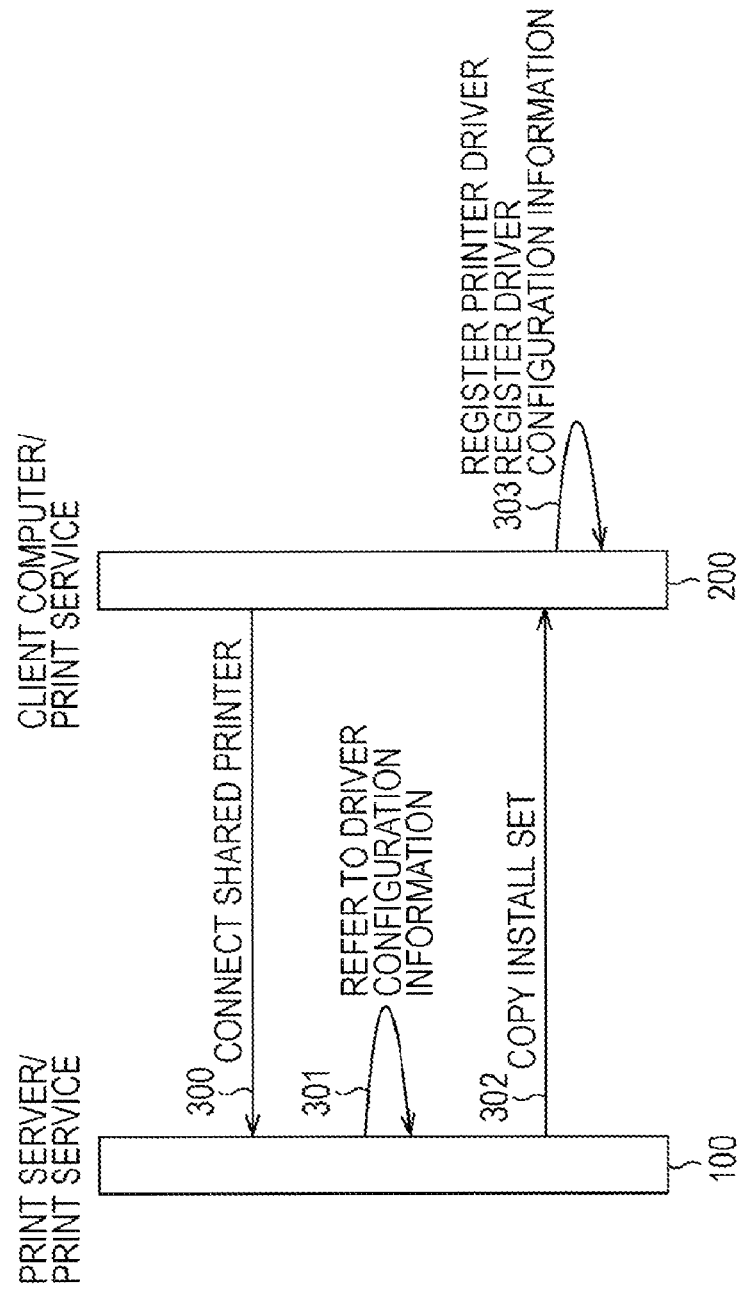
FIG. 3 is a drawing for describing a flow in an installation process of a printer driver through Point & Print®.

A description is provided of an install flow of this the Point & Print® with reference to FIGS. 2 and 3.

FIG. 2 is a function block diagram for describing a module related to a printer driver installation among functions of the print server 10 and the client computer 20.

A print service 100 on the print server 10 is a service program for controlling the print processing on the operating system (OS) of the print server 10 and the printer driver installation. In a Microsoft Corporation's Windows® OS, for example, the service program is provided by Microsoft Corporation's Spooler service. The Spooler service provides an Application Program Interface (API) used for various functions such as the generation at the printer driver to the transmission of print data to the printer, the printer driver installation, and Point & Print®. The program and the printer driver execute the processing through the API. The print service 100 according to the present embodiment is also provided with the features of Microsoft Corporation's Spooler service, or alternatively, features similar thereto. Various print services mounted as a part of the operating system can recognize the attachment and detachment of the plug-in. Driver configuration information 101 includes driver configuration information of a printer driver 102 in the print server 10 and is stored in a shared storage area of the operating system. A print queue 103 is a virtual queue functioning to temporarily hold the print data before being output to the printer apparatus.

Next, a print service 200 on the client computer 20 controls the print processing on the operating system (OS) of the client 20 and the printer driver installation similarly to the print service 100 of the print server 10. Before the execution of the Point & Print®, the printer driver 202 and driver configuration information 201 thereof are not present in the client computer 20. Using Point & Print®, these pieces of information from the print server 10 are incorporated into the client computer 20. The client computer 20 uses the incorporated information obtained through Point & Print® to print via the interface or network 40 to the laser beam printer 30.

Referring now also to FIG. 3, there is shown a drawing for describing a flow of the installation through Point & Print®. First, the user utilizing the client computer 20 connects the client computer 20 to a shared printer through the print service 200 of the client computer 20 and issues a request to Point & Print® (300). In response to this request 300, the print service 100 of the print server 10 refers to the driver configuration information 101 to decide an installation set that should be downloaded (301). Next, the print service of the print server 10 performs the following processing. In cooperation with the print service 200 of the client computer 20, the installation set of the printer driver 102 stored in the print server 10 is copied to the client computer 20 (302). Next, based on that, the print service 200 of the client computer 20 registers the printer driver 202 in the operating system of the client 20 and at the same time the driver configuration information 201 (303). As a result, the user of the client computer 20 can execute the print with respect to the printer apparatus via the print server 10.

Figure 4:
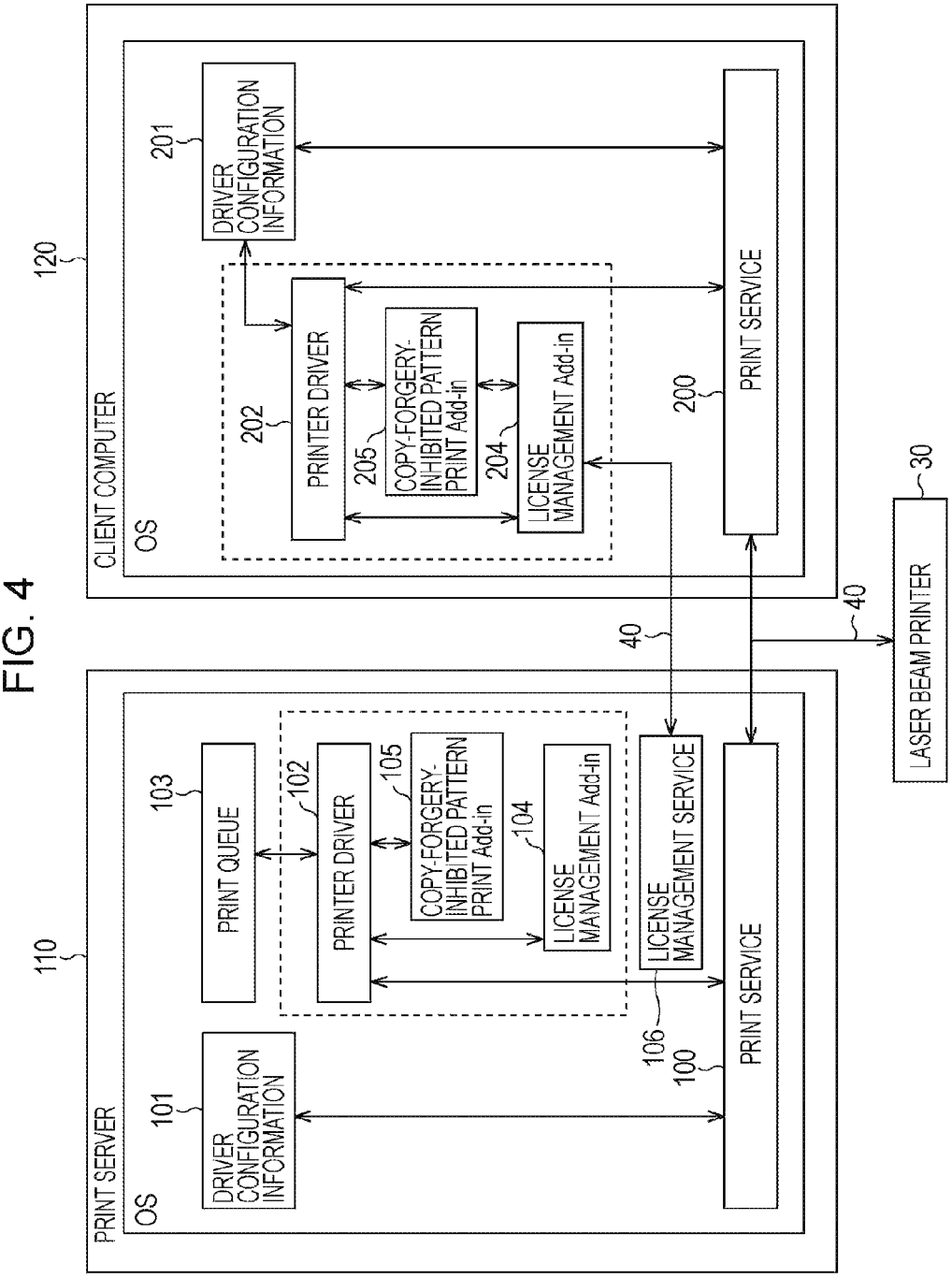
FIG. 4 is a function block diagram for describing function configurations of a print server system and a client computer in a print server system according to an exemplary embodiment of the present invention.

FIG. 4 is a function block diagram of a function configuration of the print server system according to the present invention, in which parts common to the above-described parts in FIG. 2 are denoted by the same symbols. Such parts function in the manner described above, for example with respect to FIGS. 2 and 3, as modified by the description provided below.

In FIG. 4, unlike FIG. 2, a license management Add-in 104, a copy-forgery-inhibited pattern print Add-in 105, and a license management service 106 are incorporated in a print server 110. The license management Add-in 104 and the copy-forgery-inhibited pattern print Add-in 105 are program files such as, for example, a DLL, and can be incorporated into the printer driver 102. The program of the copy-forgery-inhibited pattern print Add-in 105 specifically has a role of adding the copy-forgery-inhibited pattern print function to the printer driver 102, thereby expanding the function of the printer driver 102. The program of the license management Add-in 104 specifically has a role of adding the function for governing the Add-in license management based on the printer driver to the printer driver 102, thereby expanding the function of the printer driver 102. According to the present embodiment, only two Add-ins are added: the license management Add-in 104 and the copy-forgery-inhibited pattern print Add-in 105. However, the number of Add-ins is not limited, and therefore a plurality of Add-ins having other functions may also be added. However, only the license management Add-in 104 has a special function of managing licenses of other Add-ins, and the license management Add-in 104 is not added in plural numbers. The Add-in modules such as the license management Add-in 104 and the copy-forgery-inhibited pattern print Add-in 105 are modules for expanding the function of the printer driver 102, and are a part of the printer driver in terms of the printer driver configuration. The license management Add-in 104 and the copy-forgery-inhibited pattern print Add-in 105 are registered in the driver configuration information 101 as the part of the printer driver 102. For this reason, an OS module group for controlling the printer driver such as the print service 100 fully regards the license management Add-in 104 and the copy-forgery-inhibited pattern print Add-in 105 as the part of the printer driver 102. The printer driver 102, (having the expanded function described above), in the print server 110 is automatically downloaded to a client computer 120 and copied as the printer driver 202, for example, using Point & Print®. Thus, the license management Add-in 104 and the copy-forgery-inhibited pattern print Add-in 105 are downloaded to the client computer 120, with the downloaded copies being a license management Add-in 204 and a copy-forgery-inhibited pattern print Add-in 205 respectively. Immediately after the download, the downloaded license management Add-in communicates with the license management service 106 of the print server 10 to check about the presence or absence of the license of the copy-forgery-inhibited pattern print Add-in 205. The license management service 106 resides on the print server 110 in the description of the present embodiment, but may alternatively reside on another server (not shown).

Figure 5:
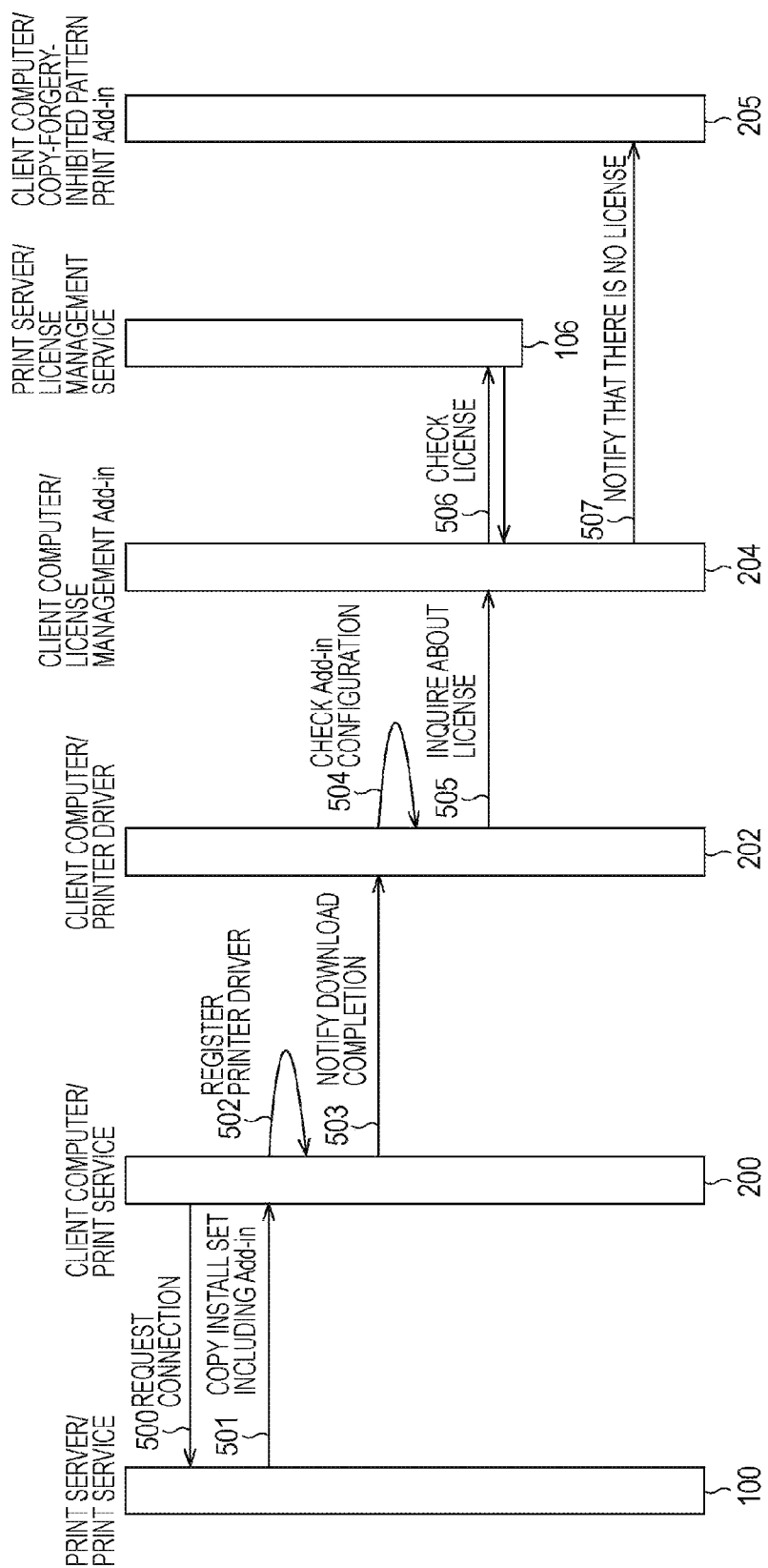
FIG. 5 is a drawing for describing a flow of processing in the print server system according to an exemplary embodiment of the present invention.

Referring now also to FIG. 5, from the print service 200 of the client computer 120 to the print service 100 of the print server 110, a connection request to the print queue 103 is issued (500). The connection request specifically means that the user starts using the printer shared in the network on the client computer 120. For example, in a case of Windows (registered trademark) XP Professional Japanese Edition, a printer and a FAX are selected from a control panel, and further, a shared printer is selected in the installation of the printer. Like functionality can alternatively be attained, for example, when the program operating on the client computer 120 calls an Add Printer Connection API. Upon the above-described connection request, with the function of the Point & Print®, the printer driver 102 including the license management Add-in 104 and the copy-forgery-inhibited pattern print Add-in 105 is automatically downloaded to the client computer 120 (501). The print service 200 of the client computer 120 registers a configuration of the printer driver 202 including the license management Add-in 204 and the copy-forgery-inhibited pattern print Add-in 205 as the driver configuration information 201 (502).

When the series of this download processing is completed, the print service 200 of the client computer 120 notifies the printer driver 202 of an event of the download completion (503). Through this notification, the printer driver 202 can recognize a moment immediately after the printer driver itself and the Add-in are downloaded to the client computer 120. The printer driver 202 refers to the driver configuration information 201 for the check to obtain the configuration of the Add-in (504). Then, the printer driver 202 inquires the license management Add-in 204 about the license of the copy-forgery-inhibited pattern print Add-in 205 (505). The license management Add-in 204 checks with a license management service of the print server 110 about the presence or absence of the license (506). As a result of the license inquiry, when it is confirmed that there is no license, the printer driver 202 notifies the copy-forgery-inhibited pattern print Add-in 205 that there is no license (507).

Figure 6:
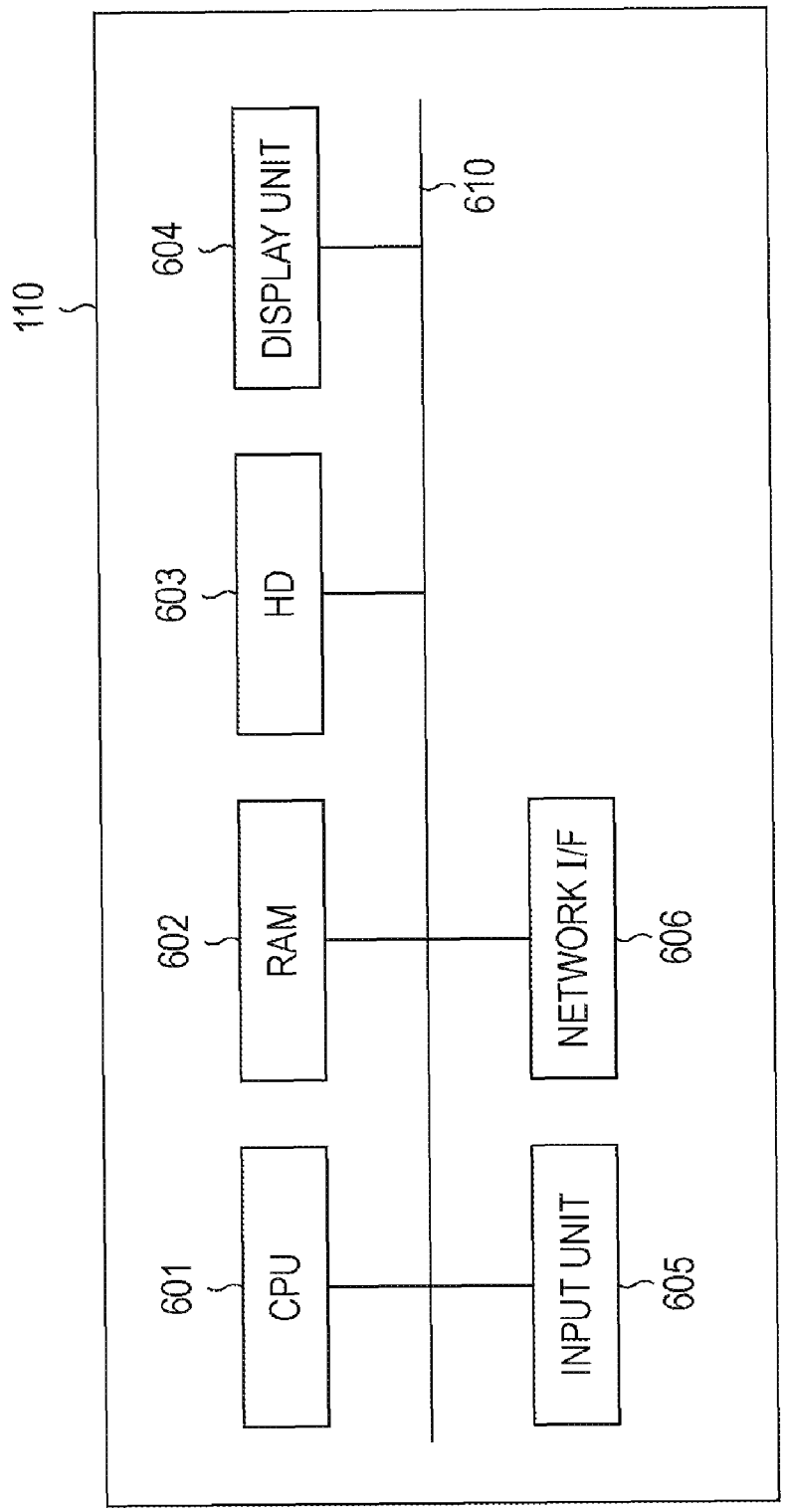
FIG. 6 is a block diagram of a hardware configuration of the print server system and the client computer according to an exemplary embodiment of the present invention.

FIG. 6 is a block diagram of a hardware configuration of the print server 110 according to the exemplary embodiment of the present invention.

In the drawing, a CPU 601 executes the processing according to the exemplary embodiment through a program loaded on a RAM 602. The RAM 602 includes a memory area for storing various programs and a memory area which is used as a work area at the time of executing a control processing by the CPU 601 and temporarily stores various data. An OS and various programs are previously installed in a hard disk (HD) 603. When the print server 110 is turned ON or the activation of the program is instructed, the instructed program is loaded on the RAM 602 and executed under the control of the CPU 601. A display unit 604 is composed of, for example, a CRT or a liquid crystal display screen. An input unit 605 includes a pointing device such as a key board or a mouse and is used for inputting data in accordance with a user operation. A network interface 606 is an interface unit for connecting to a network such as Ethernet® or the Internet. A system bus 610 connects these units to the CPU 601 for transmitting data and various control signals.

The hardware configuration of the client computer 120 is the same as (or alternatively similar to) the hardware configuration of the print server 110.

Figure 7:
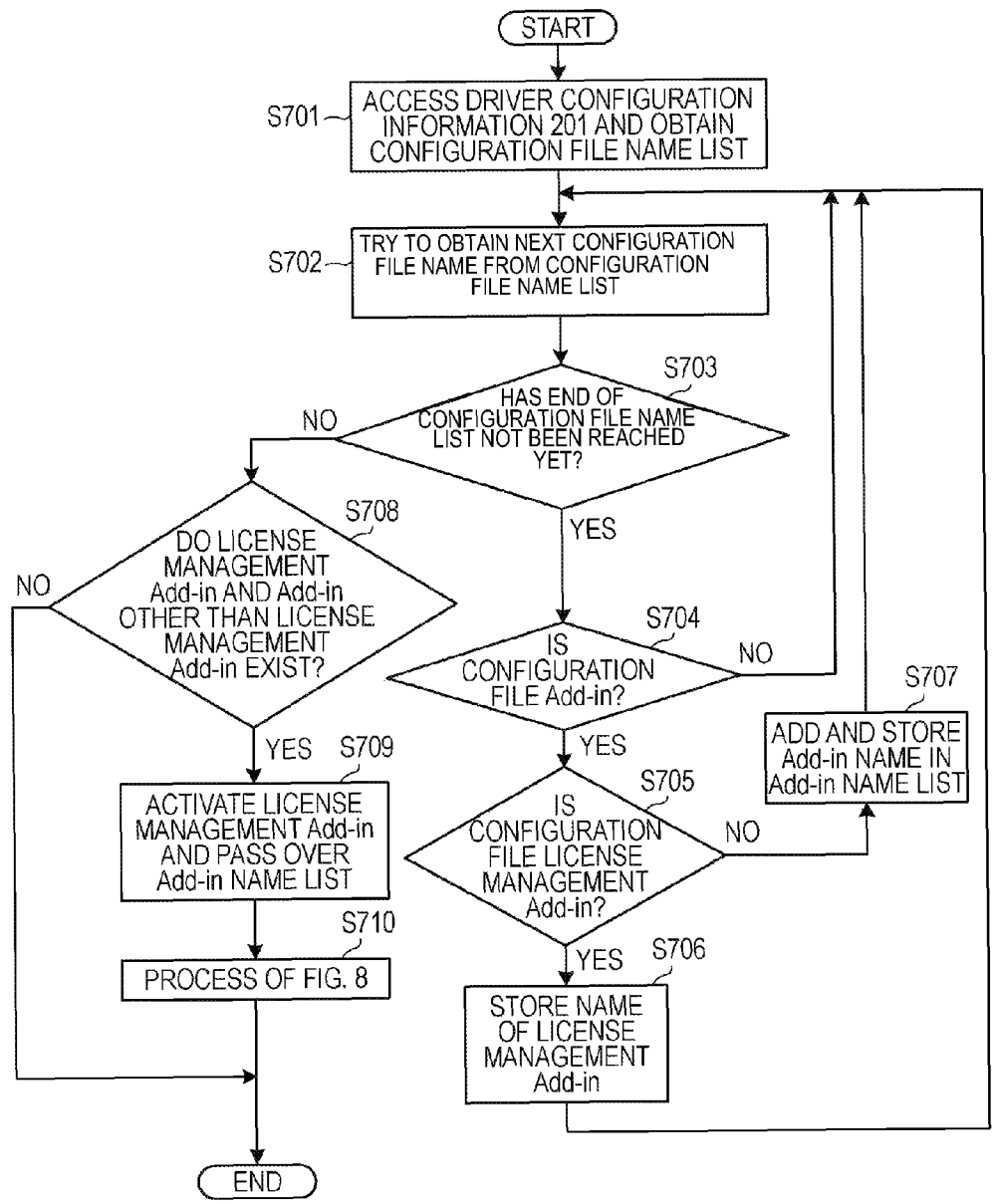
FIG. 7 is a flowchart for a flow of a processing in a print driver in the client computer according to an exemplary embodiment of the present invention.

FIG. 7 is a flowchart for a flow of processing in the printer driver 202 of the client computer 20 in the print server system according an exemplary embodiment of the present invention. The flow corresponds to a processing from 504 to 505 in FIG. 5. A program for executing this program is installed in the HD 603, and is loaded to the RAM 602 for execution. To be more specific, the print service 200 downloads the printer driver 102 from the print server 10 to register the configuration information of the printer driver 202 in the driver configuration information 201, which is executed when the printer driver 202 is called.

The following processing is executed by the printer driver 202.

First, in Step S701, the printer driver 202 refers to the driver configuration information 201 to obtain a list of driver configuration file names including the Add-ins. After that, a loop based processing that reads out a file name in the driver configuration file name list one by one is repeated (as described in Steps S702 to S707). The printer driver 202 reads the configuration file names sequentially. In Step S702, the printer driver 202 tries to read out a next configuration file name from the driver configuration file name list. For example, if it is the first time that Step S702 is performed, then the read out configuration file name would be the first configuration file name in the driver configuration file name list. In Step S703, it is determined whether the next configuration file name of Step S702 exists in the driver configuration file name list. If the next configuration file name of Step S702 exists in the driver configuration file name list, then the end of the driver configuration file name list has not been reached yet, and the flow is advanced to Step S704. In Step S703, if the next configuration file name of Step S702 does not exist in the driver configuration file name list, then the end of the driver configuration file name list has been reached, and so the loop based processing (of Steps S702 to S707) is ended and the flow is advanced to Step S708. In Step S704, the type of the configuration file corresponding to the configuration file name read out in Step S702 is checked to determine whether the configuration file is the Add-in. The configuration of the printer driver is an assembly of files of various types including a data file, a help file, and a main body of the printer driver in addition to the Add-in. In S704, only the Add-in is read out. When the configuration file is the Add-in, the flow is advanced to Step S705. When the configuration file is not the Add-in, the flow is advanced to Step S702. In Step S705, it is further determined whether the configuration file is the license management Add-in. When the configuration file is the license management Add-in, the flow is advanced to Step S706. When the configuration file is not the license management Add-in, the flow is advanced to Step S707. In Step S706, a name of the license management Add-in is determined, and the name is stored. The stored name of the license management Add-in is used in subsequent steps of S708 and S709. A plurality of license management Add-ins is not present in this exemplary embodiment. Thus, only one name is stored. In Step S707, names of Add-ins other than the license management Add-in are determined, and the names are stored. These stored names of Add-ins are used in the subsequent steps of S708 and S709. A plurality of Add-ins other than the license management Add-in can be present in this exemplary embodiment. Thus, in Step S707, a list of the plurality of names is stored unless there is only one such Add-in, in which case the name of that one such Add-in is stored. As described above, in Step S703, when it is determined that the end of the configuration file name list has been reached, the loop based processing of Steps S702 to S707 is ended and the flow is advanced to Step S708. In Step S708, based on the configuration information of the Add-in or Add-ins obtained in Steps S706 and S707, it is determined whether the license management Add-in exists and also at least one Add-in other than the license management Add-in exists. When it is determined that this condition is met, the flow is advanced to Step S709. When it is determined that this condition is not met, the license management is unnecessary, and the processing is ended. In Step S709, the printer driver 202 calls the license management Add-in 204. At this time, the printer driver 202 passes the list of the Add-in names obtained in Step S707 over to the license management Add-in 204.

Step S710 represents a processing inside the license management Add-in 204. The processing will be described with reference to FIG. 8 later. When Step S710 ends, the processing in the printer driver 202 of the client computer 20 described by FIG. 7 also ends. In this manner, the printer driver 202 is downloaded and installed, with support from Point & Print®. Then, at the time of install setup, the license management Add-in 204 is also installed and executed.

Figure 8:
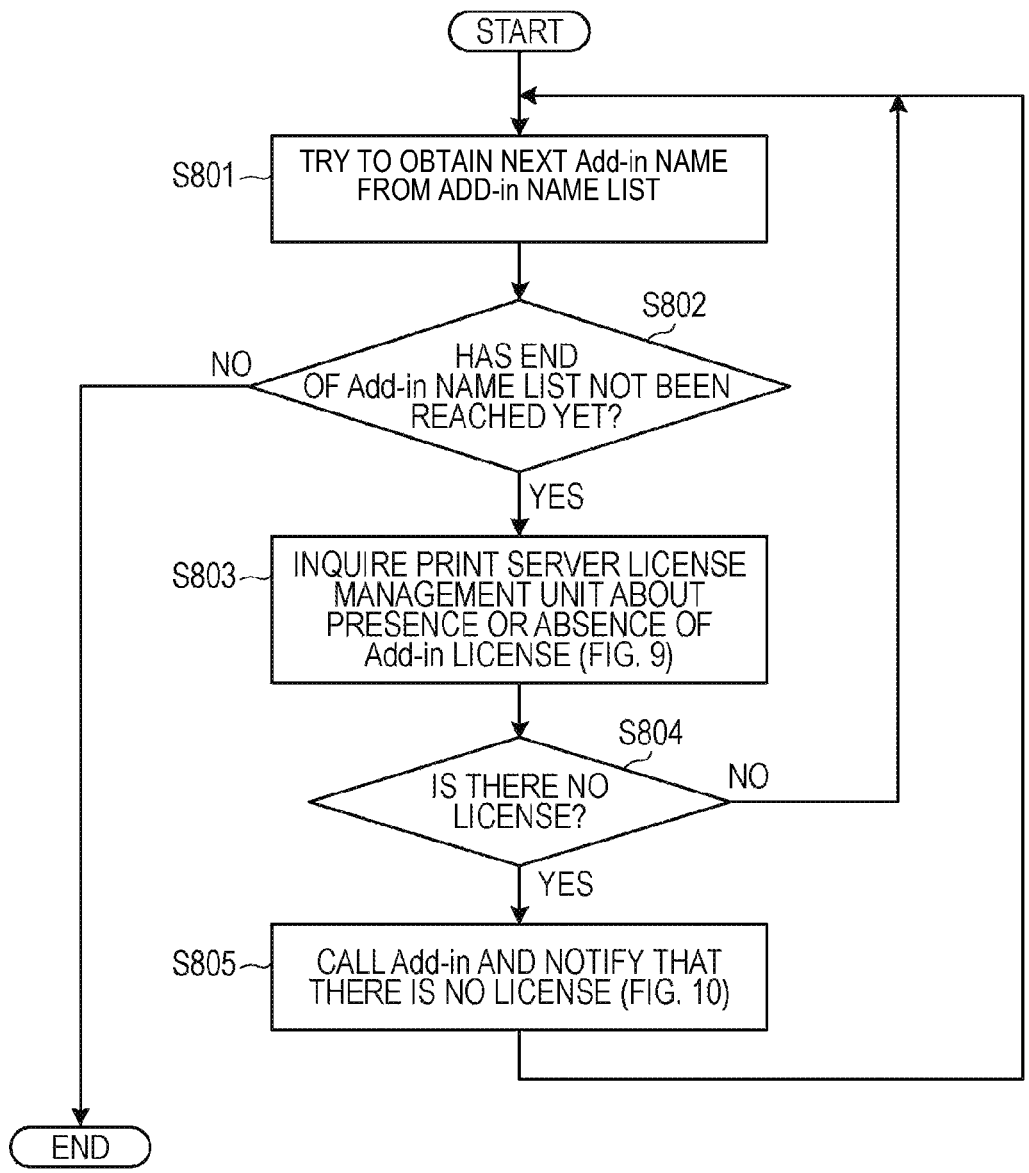
FIG. 8 is a flowchart for a flow of a license management Add-in processing in the client computer according to an exemplary embodiment of the present invention.

FIG. 8 is a flowchart for a flow of the license management Add-in 204 in the client computer 120 of the print server system according to the present invention. This flow corresponds to the processing from 506 to 507 in FIG. 5. A program for executing this processing is installed to the HD 603, and loaded to the RAM 602 for execution. To be more specific, as the printer driver 202 calls the license management Add-in 204, the processing is executed. At this time, a name of the copy-forgery-inhibited pattern print Add-in 205 is passed over as a parameter.

A loop based processing that reads out an Add-in name in the list of Add-in names one by one is repeated (as described in Steps S801 to S805). The license management Add-in 204 reads out the Add-in names sequentially. First, in Step S801, the license management Add-in 204 tries to read out a next Add-in name from the list of the Add-in names. For example, if it is the first time that Step S801 is performed, then the read out Add-in name would be the first Add-in name in the list of Add-in names. In Step S802, it is determined whether the next Add-in name of Step S801 exists in the list of the Add-in names. If the next Add-in name of Step S801 exists, then the end of the list of the Add-in names has not been reached yet, and the processing flow is advanced to Step S803. If the next Add-in name of Step S801 does not exist in the list of the Add-in names, then the end of the list of Add-in names has been reached, and the processing of FIG. 8 ends. In Step S803, the license management service 106 of the print server 110 is inquired regarding the presence or absence of the Add-in license. In the case of the present embodiment, an inquiry is made on the presence or absence of the license of the copy-forgery-inhibited pattern print Add-in 205. The license management Add-in 204 passes over a client computer name (or an ID which is uniquely determined such as an IP address) and a name of the function of the Add-in (or an ID which is uniquely determined, and herein which indicates the copy-forgery-inhibited pattern print) as parameters to the license management service 106. The processing in the license management service 106 will be described in FIG. 9 later. When the license management Add-in 204 obtains the presence or absence of the specified Add-in license from the license management service 106, the presence or absence of the license is determined in Step S804. If the license is absent, the flow is advanced to S805. If the license is present, the flow is advanced to Step S801. In Step S805, the license management Add-in 204 calls the Add-in to notify that there is no license. In the case of the present embodiment, a notification is made that there is no license in the copy-forgery-inhibited pattern print Add-in 205. The processing in the copy-forgery-inhibited pattern print Add-in 205 will be described in FIG. 10 later. As described above, in Step S802, if the end of the list of the Add-in names has been reached, the next Add-in name of Step S801 does not exist in the list of the Add-in names, and the processing of FIG. 8 ends.

Figure 9:
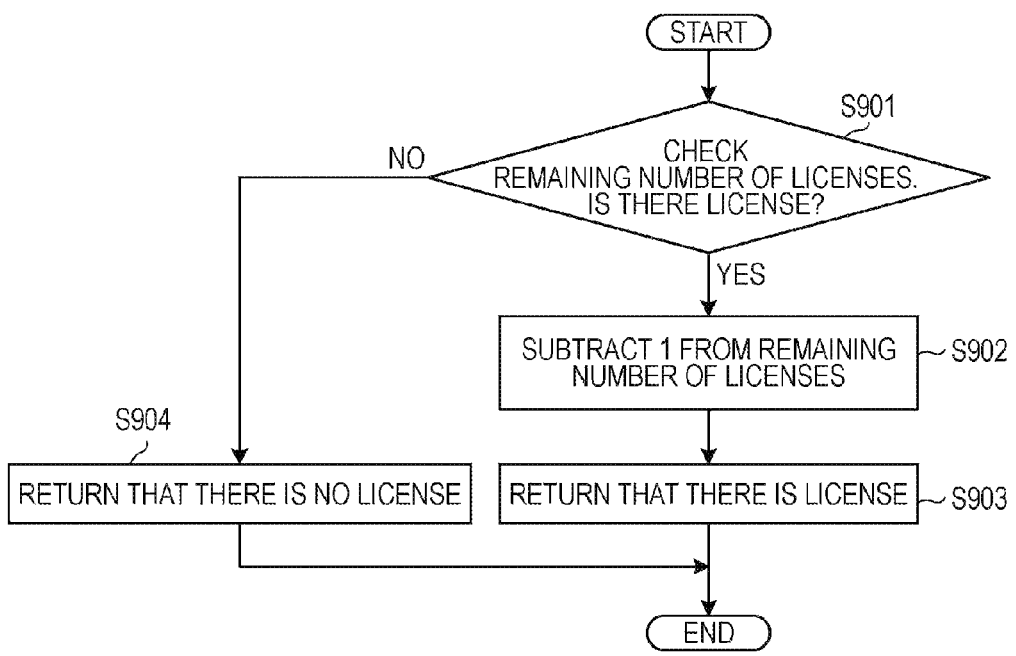
FIG. 9 is a flowchart for a flow of a license management service processing in the print server according to an exemplary embodiment of the present invention.

FIG. 9 is a flowchart for a flow of a processing in the license management service 106 of the print server 10 in the print server system according to the present invention. This flow corresponds to the processing in 506 of FIG. 5. A program for executing this processing is installed to the HD 603 and loaded to the RAM 602 for execution. To be more specific, the license management service 106 is regularly activated as a service and responds to the request of the license management Add-in 204. At this time, the license management Add-in 204 passes over a client computer name (or an ID which is uniquely determined such as an IP address) and a name of the function of the Add-in (or an ID which is uniquely determined, and herein which indicates the copy-forgery-inhibited pattern print).

First, in Step S901, the license management service 106 checks the remaining number of licenses that are matched to the client computer requesting the license and the license target function. If there is a remaining license, the flow is advanced to Step S902. In Step S902, 1 is subtracted from the remaining number of licenses, and in Step S903, the license management service 106 returns a message to the license management Add-in 204 that there is a license, and the processing of FIG. 9 ends. In Step S901, if there is no license, flow proceeds to Step S901 wherein the license management service 106 returns a message to the license management Add-in 204 that there is no license, and the processing of FIG. 9 ends.

Figure 10:
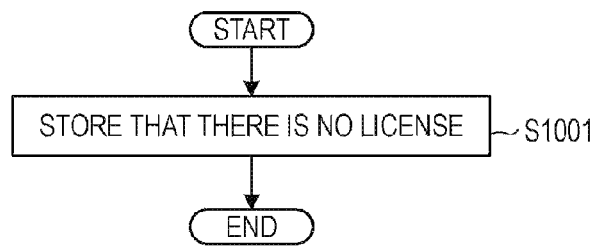
FIG. 10 is a flowchart for a flow of a copy-forgery-inhibited pattern print Add-in processing in the client computer according to an exemplary embodiment of the present invention.

FIG. 10 is a flowchart for a flow of a processing in the copy-forgery-inhibited pattern print Add-in 205 in the client computer 120 of the print server system according to the present invention. This flow corresponds to 507 in FIG. 6. A program for executing this processing is installed to the HD 603 and loaded to the RAM 602 for execution. To be more specific, the license management Add-in 204 calls the copy-forgery-inhibited pattern print Add-in 205 for execution.

In Step S1001, the copy-forgery-inhibited pattern print Add-in 205 stores in a memory that there is no copy-forgery-inhibited pattern print license. In the above, the respective processing flows have been described in the flow of the series of processing that use Point & Print® for support. After the completion of the above described processing, when the user activates an arbitrary application on the client computer 120 to perform a print, a reference is made to the memory storing the presence or absence of the license. Details thereof are described below with reference to FIGS. 11 and 12.

Figure 11:
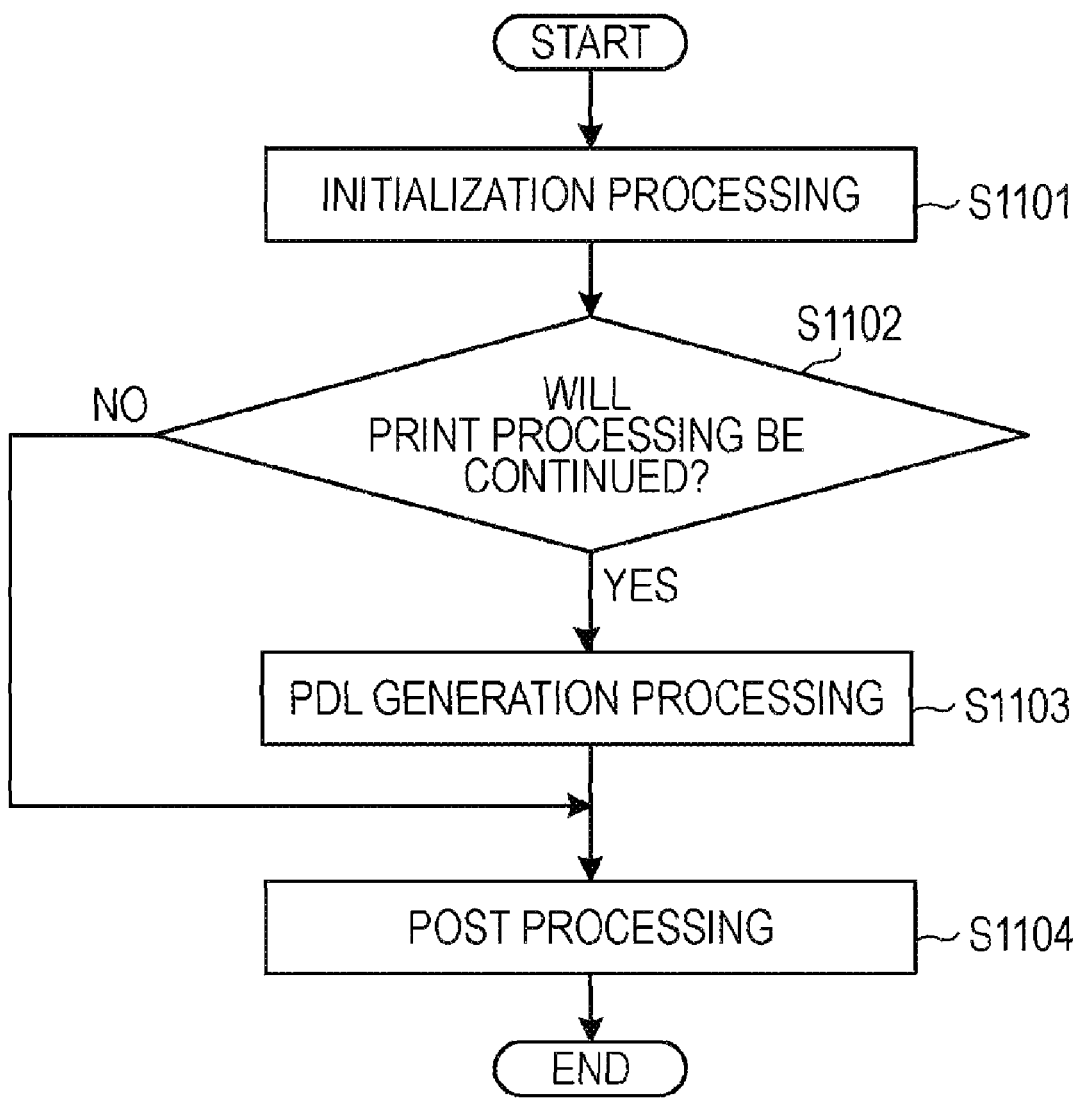
FIG. 11 is a flowchart for a flow of a processing in the printer driver at the time of print execution in the client computer according to an exemplary embodiment of the present invention.

FIG. 11 is a flowchart for a flow of a processing in the printer driver 202 in the client computer 120 of the print server system according to the present invention. After the completion of the series of processing described in FIG. 5, when the user activates an arbitrary application on the client computer 120 to perform a print, the printer driver 202 is called. A flow in the print processing of the printer driver 202 at this time will be described. A program for executing this processing is installed to the HD 603 and loaded to the RAM 602 for execution.

First, in Step S1101, the printer driver 202 is initialized. In this initialization processing, a negotiation start processing of the interface with the operating system, a print setting obtaining processing, an Add-in initialization processing and the like are performed. The Add-in initialization processing which is important in the present embodiment will be described in FIG. 12. The print setting described herein means a print setting to the printer driver and refers to data holding a setting related to the print such as a sheet size or a sheet direction. As a save format of the print setting, binary data called DEVMODE in Microsoft Windows (registered trademark) and XML format data called print ticket are often used. As a result of the processing in Step S1101, it is determined whether the print processing is continued in the next Step S1102. When the print processing is continued, the flow is advanced to Step S1103, where a page description language (also referred to as PDL) which can be input to the printer apparatus 30 is output. In Step S1104, a post processing is performed and the processing is ended. In S1102, when the print processing will be stopped, Step S1103 is skipped. Only the post processing in Step S1104 is executed and the processing is ended.

Figure 12:
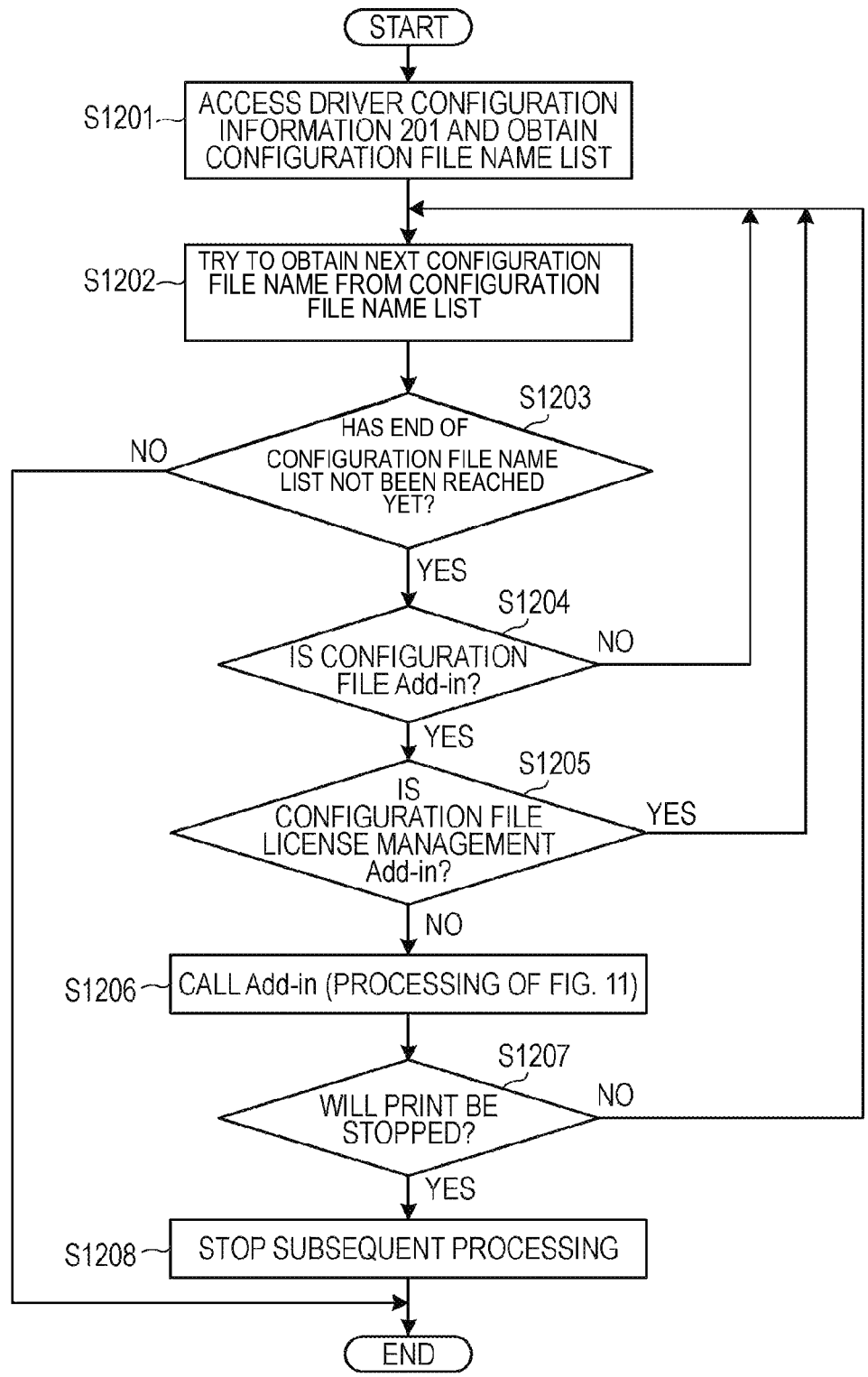
FIG. 12 is a flowchart for a flow of an Add-in initialization processing in the printer driver at the time of print execution in the client computer according to an exemplary embodiment of the present invention.

FIG. 12 is a flowchart for a flow of a processing in the printer driver 202 in the client computer 20 of the print server system according to the present invention. The Add-in initialization processing Add-in is performed in Step S1101 of FIG. 11, and the detail of the processing is described with reference to FIG. 12. A program for executing this processing is installed to the HD 603 and loaded to the RAM 602 for execution.

First, in Step S1201, the printer driver 202 refers to the driver configuration information 201 to obtain the driver configuration file name list also including the Add-in. After that, a loop based processing of reading out a file name in the driver configuration file name list one by one is repeated (as described in Steps S1202 to S1207). The configuration file names are read out sequentially. In Step S1202, a next configuration file name is read out from the driver configuration file name list. For example, if it is the first time that Step S1202 is performed, then the read out configuration file name is the first configuration file name in the driver configuration file name list. In Step S1203, it is determined whether the next configuration file name of Step S1202 exists in the driver configuration file name list. If the next configuration file name of Step S1202 exists in the driver configuration file name list, then the end of the driver configuration file name list has not been reached yet, and so the flow is advanced to Step S1204. In Step S1203, if the next configuration file name of Step S1202 does not exist in the driver configuration file name list, then the end of the driver configuration file name list has been reached, and so the processing of FIG. 12 ends and the processing of FIG. 11 continues. In Step S1204, the type of the configuration file corresponding to the next configuration file name of Step S1202 is checked to determine whether the configuration file is the Add-in. The configuration of the printer driver is an assembly of files of various types including a data file, a help file, and a main body of the printer driver in addition to the Add-in, and therefore only the Add-in is taken out in Step S1204. When the configuration file is the Add-in, the flow is advanced to Step S1205. When the configuration file is not the Add-in, the flow is advanced to Step S1202. In Step S1205, it is further determined whether the configuration file is the license management Add-in. When the configuration file is not the license management Add-in, the flow is advanced to Step S1206. When the configuration file is the license management Add-in, the flow is advanced to S1202. In Step S1206, the Add-in is called. According to the present embodiment, the copy-forgery-inhibited pattern print Add-in 205 is called. The copy-forgery-inhibited pattern print Add-in 205 returns whether the print will be stopped. A detail of the processing is described below with reference to FIG. 13. In Step S1207, in accordance with the instruction returned by the copy-forgery-inhibited pattern print Add-in 205, whether the print will be stopped is determined. When the print will be stopped, the flow is advanced to S1208 wherein subsequent print processing is stopped and the processing is ended. When the print will not be stopped, the flow is advanced from Step S1207 to Step S1202. As described above, in Step S1203, if the end of the driver configuration file name list has been reached, the processing of FIG. 12 ends and the processing of FIG. 11 continues.

Figure 13:
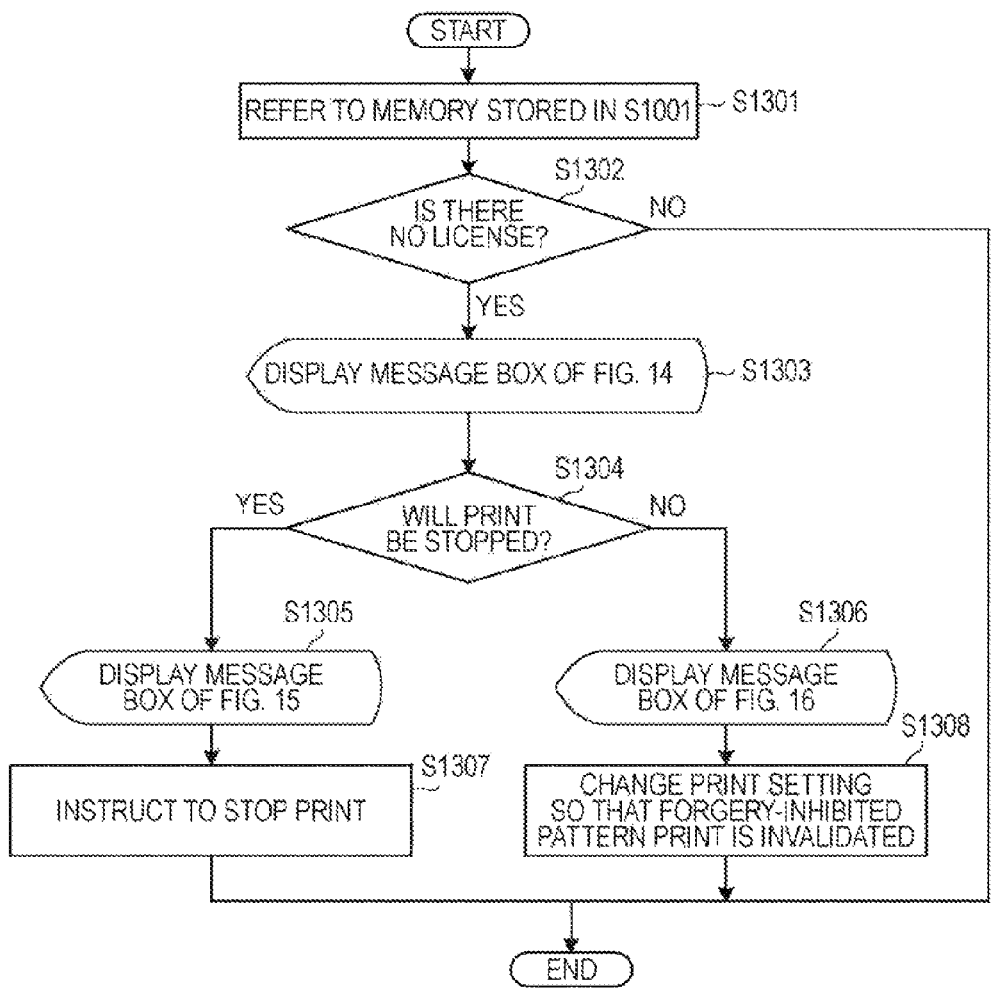
FIG. 13 is a flowchart for a flow of the copy-forgery-inhibited pattern print Add-in processing at the time of print execution in the client computer according to an exemplary embodiment of the present invention.

FIG. 13 is a flowchart for a flow of a processing in the copy-forgery-inhibited pattern print Add-in 205 in the client computer 120 of the print server system according to the present invention. After the completion of the series of processing described in FIG. 5, when the user activates an arbitrary application on the client computer 120 to perform a print, the printer driver 202 is called, and further, the copy-forgery-inhibited pattern print Add-in 205 is called. A program for executing this processing is installed to the HD 603, and loaded to the RAM 602 for execution.

Figure 14:
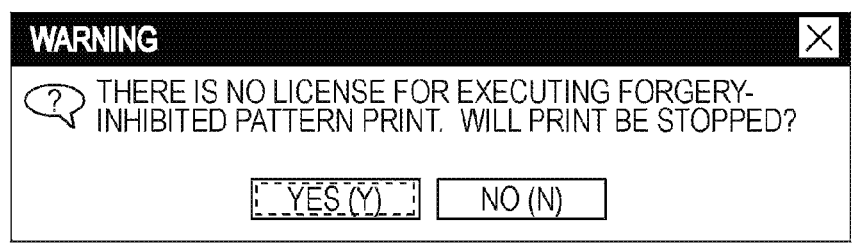
FIG. 14 illustrates a user interface displayed by the copy-forgery-inhibited pattern print Add-in at the time of print execution in the client computer according to an exemplary embodiment of the present invention.
Figure 15:
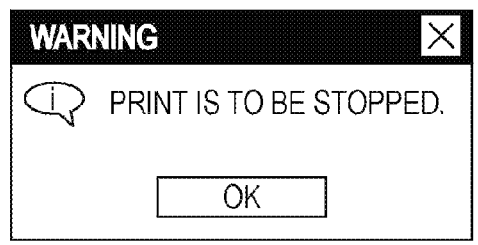
FIG. 15 illustrates another user interface displayed by the copy-forgery-inhibited pattern print Add-in at the time of print execution in the client computer according to an exemplary embodiment of the present invention.
Figure 16:
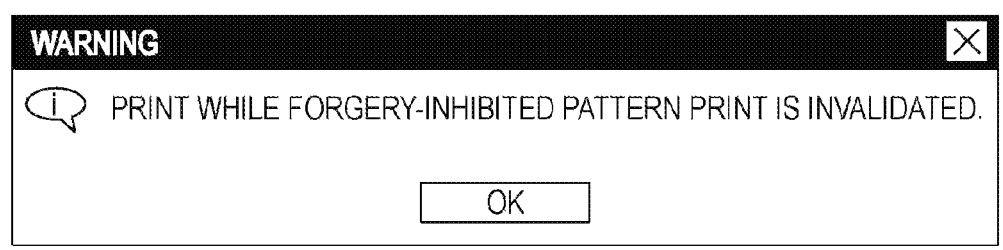
FIG. 16 illustrates still another user interface displayed by the copy-forgery-inhibited pattern print Add-in at the time of print execution in the client computer according to an exemplary embodiment of the present invention.

First, in Step S1301, the memory having the memory in Step S1001 in FIG. 10 is referred to. Thus, the presence or absence of the Add-in license can be determined. In Step S1302, the presence or absence of the license is determined. When there is no license, the flow is advanced to S1303. When there is a license, no processing is performed and the processing of FIG. 13 ends. In Step S1303, the copy-forgery-inhibited pattern print Add-in 205 displays a message box of FIG. 14 to urge the user to select whether the print will be stopped. Based on a result of the selection by the user, whether the print will be stopped is determined in Step S1304. When the print will be stopped, the flow is advanced to Step S1305 wherein a message box of FIG. 15 is displayed, and responsive to a user selecting OK in the message box, the flow is advanced to Step S1307 wherein the printer driver 202 is instructed to stop the print and the processing of FIG. 13 ends. In Step S1304, when the print will not be stopped, the flow is advanced to Step S1306 wherein a message box of FIG. 16 is displayed, and responsive to a user selecting OK in the message box, the print setting is changed so that the copy-forgery-inhibited pattern print is invalidated and the processing of FIG. 13 ends.

The above-described configurations may be summarized as follows.

Referring again to FIG. 4, the client computer 120 has been disclosed which downloads the expansion module for the print driver from the print server 110.

Referring now also to FIG. 6, the client computer 120 is provided with the network I/F 606 for receiving the expansion module for the print driver and the license management program from the print server 110. The client computer 120 uses the printer driver to call the license management program received by the reception unit in accordance with the reception processing. The client computer 120 executes the CPU 601 to obtain the license information indicating the license status of the expansion program.

By using the obtained license information, whether use of the expansion program in the information processing apparatus is permitted is decided by executing the CPU 601. This processing is performed by using the license Add-in that is an example of the license management program.

Upon the setup of the Add-in that is an example of the expansion module through the download, the following processing is performed. By executing the CPU 601, the client computer 120 detects that the printer driver is notified of the event on the download completion of the expansion module.

In response to the event in which the CPU 601 detects the event on the download completion, the client computer 120 executes the CPU 601 to call the license management program.

The client computer 120 uses the CPU 601 to execute the license management program and obtains the license information from the server apparatus.

Furthermore, the client computer 120 registers the driver configuration information of the received expansion module in the registry. In response to an event in which the CPU 601 detects the event on the download completion, the license information related to the expansion module indicated by the registered driver configuration information is obtained by using the license management program.

The license management program is the expansion module of the printer driver program. In response to the detection of the event on the download completion, the CPU 601 executes the license management program as the expansion program of the printer driver.

As described above, when the printer driver detects the download, the printer driver reads the driver configuration information. Such a configuration is adopted that if the license management Add-in is included in the driver configuration information, the Add-in is executed first. In this manner, when the Point & Print® is executed, the license management Add-in is executed. With this configuration, the license management Add-in can determine about the presence or absence of the license of the program similarly included in the configuration information.

The CPU 601 is provided for performing a restriction on the use of the expansion program and/or a warning of a non-permission of the use when it is decided that the use in the client apparatus of the expansion program is not permitted.

According to the present embodiment, in a state where the Add-in function (for example, the copy-forgery-inhibited pattern print) that can be detachably attached to the printer driver on the print server is added, even when the automatic download to the client computer is executed through the Point & Print® function, the license management can be performed. Also, as the license management function itself is also realized by using the Add-in function that can be detachably attached to the printer driver, it is possible to perform the flexible control management.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-021419 filed Jan. 31, 2007, which is hereby incorporated by reference herein in its entirety.

What is claimed is:

1. An information processing apparatus for downloading an expansion module for a printer driver from a server apparatus for setup, comprising:
   a reception unit configured to receive the expansion module for the printer driver and a license management program from the server apparatus;
   an obtaining unit configured to obtain license information from the server apparatus indicating a remaining number of licenses of the expansion module by calling the license management program when the reception unit receives the expansion module for the printer driver and the license management program;

a decision unit configured to decide whether use of the expansion module is permitted based on the license information; and a control unit configured to: (i) control a printer such that a printing process uses an expanded function provided by the expansion module when the decision unit decides that use of the expansion module is permitted, (ii) display a first screen for notifying a user that the expansion module is not licensed and allowing the user to select whether the printing process should be stopped when the decision unit decides that use of the expansion module is not permitted, (iii) display a second screen for notifying the user that the printing process is stopped and control the printer to stop the printing process when the user uses the first screen to stop the printing process, and (iv) display a third screen for notifying the user that the printing process without the expanded function is performed and control the printer to perform the printing process without the expanded function when the user does not stop the printing process using the first screen.

2. The information processing apparatus according to claim 1, further comprising a detection unit configured to detect a notification to the printer driver of a download completion event when the expansion module has been completely downloaded, wherein the obtaining unit calls the license management program in response to detecting the download completion event.

3. The information processing apparatus according to claim 2, further comprising:
a registration unit configured to register driver configuration information of the expansion module received by the reception unit,
wherein the obtaining unit obtains license information related to the expansion module indicated by the driver configuration information registered by the registration unit by using the license management program in response to detecting the download completion event.

4. An information processing method for an information processing apparatus for downloading an expansion module for a printer driver from a server apparatus for setup, the information processing method comprising:
receiving the expansion module for the printer driver and a license management program for the server apparatus;
obtaining license information from the server apparatus indicating a remaining number of licenses of the expansion module by calling the license management program when the expansion module for the printer driver and the license management program is received;
deciding whether use of the expansion module is permitted based on the license information;
controlling a printer such that a printing process uses an expanded function provided by the expansion module when it is decided that use of the expansion module is permitted;
displaying a first screen for notifying a user that the expansion module is not licensed and allowing the user to select whether the printing process should be stopped when it is decided that use of the expansion module is not permitted;
displaying a second screen for notifying the user that the printing process is stopped and controlling the printer to stop the printing process when the user uses the first screen to stop the printing process; and
displaying a third screen for notifying the user that the printing process without the expanded function is performed and controlling the printer to perform the printing process without the expanded function when the user does not stop the printing process.

5. The information processing method according to claim 4, further comprising:
detecting a notification to the printer driver of a download completion event when the expansion module has been completely downloaded,
wherein obtaining license information includes calling the license management program in response to detecting the download completion event.

6. The information processing method according to claim 5, further comprising:
registering driver configuration information of the received expansion module,
wherein obtaining license information includes obtaining, in response to detecting the download completion event, license information related to the expansion module indicated by the registered driver configuration information.

7. A non-transitory computer-readable medium storing a control program for instructing a computer to execute an information processing method for an information processing apparatus for downloading an expansion module for a printer driver from a server apparatus for setup, the information processing method comprising:
receiving the expansion module for the printer driver and a license management program for the server apparatus;
obtaining license information from the server apparatus indicating a remaining number of licenses of the expansion module by calling the license management program when the expansion module for the printer driver and the license management program is received;
deciding whether use of the expansion module is permitted based on the license information;
controlling a printer such that a printing process uses an expanded function provided by the expansion module when it is decided that use of the expansion module is permitted;
displaying a first screen for notifying a user that the expansion module is not licensed and allowing the user to select whether the printing process should be stopped when it is decided that use of the expansion module is not permitted;
displaying a second screen for notifying the user that the printing process is stopped and controlling the printer to stop the printing process when the user uses the first screen to stop the printing process; and
displaying a third screen for notifying the user that the printing process without the expanded function is performed and controlling the printer to perform the printing process without the expanded function when the user does not stop the printing process.

* * * * *